United States Patent [19]

Holbein et al.

[11] Patent Number: 4,732,410

[45] Date of Patent: * Mar. 22, 1988

[54] IDENTIFICATION CARD AND A METHOD OF PRODUCING SAME

[75] Inventors: Hans J. Holbein; Thomas Maurer, both of Munich, Fed. Rep. of Germany

[73] Assignee: GAO Gesellschaft fuer Automation und Organisation mbH, Fed. Rep. of Germany

[*] Notice: The portion of the term of this patent subsequent to Jun. 18, 2002 has been disclaimed.

[21] Appl. No.: 729,195

[22] Filed: May 1, 1985

Related U.S. Application Data

[63] Continuation of Ser. No. 330,890, Dec. 14, 1981, Pat. No. 4,523,777.

[30] Foreign Application Priority Data

Dec. 23, 1980 [DE] Fed. Rep. of Germany ....... 3048733

[51] Int. Cl.$^4$ .............................................. B42D 15/00
[52] U.S. Cl. ...................................... 283/67; 283/114; 283/904; 283/75; 283/100; 346/76 L
[58] Field of Search ................... 282/27.5; 283/67, 75, 283/100, 114, 904; 346/76 L, 135.1; 427/7

[56] References Cited

U.S. PATENT DOCUMENTS

| | | | |
|---|---|---|---|
| 2,929,736 | 3/1960 | Miller et al. | 282/27.5 X |
| 3,351,948 | 11/1967 | Bonn | 346/76 |
| 3,792,481 | 2/1974 | Nagashima | 346/76 L |
| 4,214,249 | 7/1980 | Kasai et al. | 346/76 L |
| 4,523,777 | 6/1985 | Holbein et al. | 283/67 |

FOREIGN PATENT DOCUMENTS

| | | |
|---|---|---|
| 695406 | 8/1940 | Fed. Rep. of Germany . |
| 2532935 | 2/1976 | Fed. Rep. of Germany . |
| 2951486 | 6/1982 | Fed. Rep. of Germany . |
| 7905973 | 10/1980 | France . |
| 1193511 | 6/1970 | United Kingdom . |
| 2039466 | 8/1980 | United Kingdom . |
| 2040807 | 9/1980 | United Kingdom . |
| 2075917 | 11/1981 | United Kingdom . |

Primary Examiner—Paul A. Bell
Attorney, Agent, or Firm—Robert J. Koch

[57] ABSTRACT

An identification card having information applied in the form of patterns, letters, numbers and/or images, formed by interruptions in the homogeneity of different colored layer areas arranged superjacently on the identification card. The colored information can be produced by selectively removing the color layers by means of a controlled laser beam or by blurring or other chemical reactions induced by said beam. Thus identification cards can be produced having a high standard of security in spite of the simplicity of their production.

12 Claims, 3 Drawing Figures

IDENTIFICATION CARD AND A METHOD OF PRODUCING SAME

This is a continuation of application Ser. No. 330,890, filed Dec. 14, 1981 now U.S. Pat. No. 4,523,777.

BACKGROUND OF THE INVENTION

The invention relates to an identification card having information in the form of patterns, letters, numbers and/or images applied by means of a laser beam, and a method of producing same.

Identification cards in the form of credit cards, bank cards, cash payment cards and so on are used increasingly in all kinds of service sectors, cashless payments and within enterprises. Due to their extensive use they are typical mass production items, on the one hand, i.e. their production must be simple and economical; on the other hand they must be designed in such a way that they are protected against forgery and falsification to as great a degree as possible. The many sorts of identification cards already on the market and still in a stage of development testify to the efforts of the relevant industry to optimize these two contradictory conditions.

In particular, it is necessary that the data relating to the card owner which are applied during the so-called personalization of the identification card, be protected in such a way that they cannot be manipulated afterwards. One possibility which has proved very useful in practice is the embedment of a paper inlay designed as a security print in a multilayer card. The paper inlay with its authenticity features such as watermarks, safety threads, steel intaglio printing, etc., known in the production of security paper, meets the highest standards of security and is protected against all kinds of attempted forgery and falsification due to the transparent cover film.

Mainly because of their much simpler and more economical production, all-plastic cards are also used in the identification card sector, in which the identification card data and the general printed pattern are applied to the outer surface of a small plastic card which can have a multilayer construction, if desired. In various embodiments of this type of identification card the user-related data (name, account number, etc.) are impressed into the back of the identification card so as to be in relief on the front. This allows for the transfer of the personalization data onto bills, etc. by means of an ink-ribbon in the various stores.

In spite of the economic advantages of this type of all-plastic identification card, it has turned out to be particularly disadvantageous that the directly accessible printed pattern and the personalization data are relatively unprotected against attempted falsification. The impressed data are, for example, "ironed flat" by a manipulator and then imprinted over with other data. If necessary, the printed pattern can be removed with solvents available everywhere and replaced or added to by another printed pattern.

As no security techniques for all-plastic identification cards are known up to now, which are economically feasible, on the one hand, and can be checked by anyone without any auxiliary means and cannot be imitated by means of readily available devices and materials, on the other hand, the production of total forgeries is usually possible even with the most simple means.

In order to solve this problem of lacking protection against forgery and falsification, all kinds of security features have already been proposed, such as codings embedded inside the identification card that can be "read" by IR light, holographic storage methods, etc. All these techniques, however, have the great disadvantage that they cannot be checked without elaborate auxiliary means and thus are inaccessible to the man on the street.

For the same purpose all-plastic identification cards have also been proposed, in which the photo of the card owner is engraved in a color or film layer which is usually laminated onto the outer surface (published German patent Document No. 22 25 471). The engraving is done by means of a mechanical chisel which scans the surface of the card point by point, thereby producing a sort of screen image. It is obvious that this method requires elaborate mechanics which are liable to break down. The production of this type of identification card is also slow due to the mechanical scanning or engraving point by point, which proves to be very disadvantageous for mass production. A further disadvantage is that the nicks made by the chisel during the engraving of the card, which must necessarily have a certain depth, reduce the stability of the identification card. A high degree of fatigue strength under reversed bending stresses, however, is an indispensible condition for the card, especially for daily use.

In the same connection, all-plastic identification cards have also been proposed in which photographically developed pictures of the user are embedded. This type of card is, however, unsuitable for practical use due to its dependence on the photographic method, which is generally relatively unfavorable for card technology and decentral card production, because it adopts a disadvantage in the production of the identification card with a paper inlay (the application of personalization data—in this case a photo—before completion of the identification card) without being able to utilize the very positive safety aspects of the inlay identification card (security paper inlay, etc.).

Taking the safety and production aspects into account, published German patent Document No. 29 07 004 also discloses an identification card having a card inlay made of paper and a transparent cover film, in which the person-related data are inscribed in the card inlay by means of a laser beam after the cover film has been laminated on. The information can in this case be burned into the inlay, but it can also be present as discoloration of a thermosensitive coating applied to the inlay. This type of card offers a high degree of security against falsification and forgery, as the data are protected by the cover film. As the burning in of the identification card data more or less destroys the structure of the material, on the one hand, and such data must therefore be protected against direct mechanical stress, but the discoloration present in a coating is relatively easy to remove or manipulate, on the other hand, when it is directly accessible, the personalization of identification cards as described above does not appear feasible in the case of identification cards in which the data are directly accessible on the outer surface.

SUMMARY OF THE INVENTION

The invention is thus based on the problem of providing an identification card which can be produced easily and economically and still has a high standard of security.

This problem is solved according to the invention in that the identification card has differently colored superjacent layer areas in which the visually recognizable information is formed by at least partial interruptions in the homogeneity of the colored layers.

In a development of the invention the personalization data, in particular pictoral representations, are worked into the multilayer areas in such a way that a multicolor impression is created by the varying degree (depth) of the interruptions in the colored areas.

The interruption of the colored areas is carried out according to the invention by means of a laser recorder. For it has been shown, surprisingly enough, that the energy of a laser beam can be controlled in such a way that selective removal is possible in the case of several superjacent color layers, i.e. the color layers which are only a few $\mu$m thick can be removed in shapes which can be precisely limited geometrically. The color layers are virtually vaporized by the energy supplied by the laser beam. When the characteristics of the color layers, in particular the absorptive behavior and the boiling points, are accordingly selected, the removal can be limited to only one color layer at a time, hardly influencing the color tone of the color layer below.

When the melting points of the colorants, their mixability and their absorptive behavior are selected accordingly, and the laser beam is appropriately controlled, it is also possible to make the individual color layers melt, which can either lead to an additive mixture of the individual colors or to a chemical reaction of the colorants with each other or with their environment. However, it must be taken care that the melting or reaction temperature of the colorants is below the temperature to which the card is normally exposed.

The use of micro-capsules filled with a certain catalyst or reactant can also be advantageous in this connection.

The fine removal that can be achieved by means of a laser beam also makes it possible in an advantageous development of the invention to form a colored picture with a dot technique like the ones known, for example, in color television technology. In this case, a red, a green and a blue dot form a so-called color triplet, as is generally known. A certain color mixture which can correspond to almost any color tone in the spectrum becomes visible to the viewer according to whether all three red, blue and green dots or only a part of these three colors are shown.

It can be advantageous, especially in the production of multicolor representations, to cover the various color layers with a neutrally acting upper layer, in order to convey a neutral impression in the places in which no color information is supposed to be present.

The same effect can also be achieved in these places, of course, without this neutral layer, by completely removing the layers right down to the card foundation.

The identification cards according to the invention obviously possess numerous advantages. They are extremely safe in spite of their simple basic construction and cheaper production, which is limited to simple printing techniques as used for usual identification cards. This high level of security is due to the fact that the appearance of the cards is essentially characterized by the laser writing technique, the essential features thus obtained cannot be imitated by other techniques and the presence of these essential features can be checked without auxiliary means. As the technologically very high quality laser recorders that can be used for the personalization of the cards according to the invention are only available in a few places, a high degree of protection against falsification and total forgery results. The layer thicknesses which are in the $\mu$m range cannot be removed or influenced in the same way as with laser beams by other techniques of removal such as scraping, etching, etc. On the other hand, the identification cards can only be produced by means of usual techniques when colors having the proper effect are employed. A changeover to the novel cards does not require any basically novel production equipment for the previous card producers. Furthermore, these cards can be personalized decentrally subsequent to the actual production of the identification cards, as can those disclosed in the published German patent Document No. 29 07 004.

Along with the personalization of the identification cards, other data not related to the user can of course also be applied using the method according to the invention. The possibility of achieving multicolor representations with the computer controlled laser beam allows, even in the case of a unified construction of the identification card, for a great range of variation as far as the picture motifs are concerned which can be produced by corresponding changes in the software in an extremely simple manner. The character of the multicolor pictures produced without any photographic developing processes can also be influenced additionally by the arrangement and construction of the color layers printed over each other, in an extremely simple manner.

Finally the possibility of virtually incorporating a certain level of technical effort into the printing inks by means of chemical reactions (color reactions) that can be effectively controlled, allows for an increase in protection against forgery.

As all personalization data are stored on a unified data carrier, no problems occur when assigning data records to each identification card. Such difficulties as these arise, as mentioned above, whenever, for example, a photo must be used as a model in addition to a data carrier containing the person-related data.

As opposed to the necessarily slow mechanical engraving techniques, the high processing speed of the method according to the invention is an advantage which is of especial value for this product, since a great number of cards must often be produced within a very short time.

BRIEF DESCRIPTION OF THE DRAWINGS

In the following, some embodiments of the invention are described by way of example on the basis of the adjoined drawings. These show.

DETAILED DESCRIPTION OF THE PREFERRED EMBODIMENTS

Figure 1:
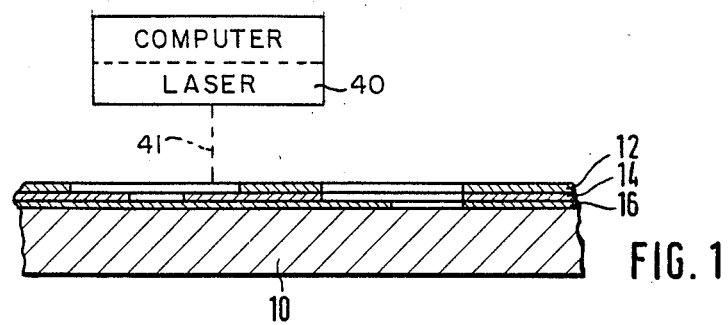
FIG. 1 an enlarged cross-section of a first embodiment of the identification card, FIG. 2 a top view of a section of an identification card produced by the same technique as the identification card as in FIG. 1, and FIG. 3 an enlarged cross-section of part of the identification card as in a second embodiment.
Figure 2:
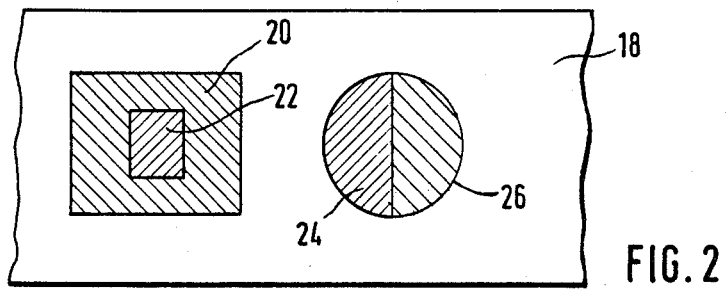

FIG. 1 shows that three color layers 12,14,16 which are to be red, green and blue are applied to the card carrier 10. The uppermost layer 12 is red, the middle layer 14 is blue and the lowest layer 16 is green. Part of the color layers is vaporized off or removed by an appropriately controlled laser 40 beam 41 which crosses the card linearly. The pattern shown in FIG. 2 results, having the following color distribution. The surface 18 of the card is red corresponding to the uppermost color layer 12. The area 20 appears blue and the area 22 green. The area 24 of the symbol on the right in FIG. 2 is also green; the color layers were removed through to the bottom in the area 26 so that the color of the synthetic body appears. The surface of the synthetic body can be made to start melting and be discolored appropriately in the process according to the energy of the laser beam.

The colors of the individual color layers must be selected in such a way that they have boiling points and/or absorptive behavior differing from each other as much as possible in the spectral range of the laser. Obviously, the lowest layer will have the highest boiling point and/or the least absorptive behavior. The separation of the layers can be carried out without difficulties if the boiling points and/or absorption characteristics differ sufficiently from each other.

The thickness of the layers 12 to 16 has been shown in an exaggerated manner; in reality it is only a few $\mu$m. As the laser beam is computer controlled, patterns and picture symbols can be produced which are as complicated as one desires. The simple symbols shown merely serve the purpose of explaining the technique employed better.

As mentioned at the outset, multicolor pictures can be produced by this technique without the use of any photographic developing processes whatsoever.

Figure 3:
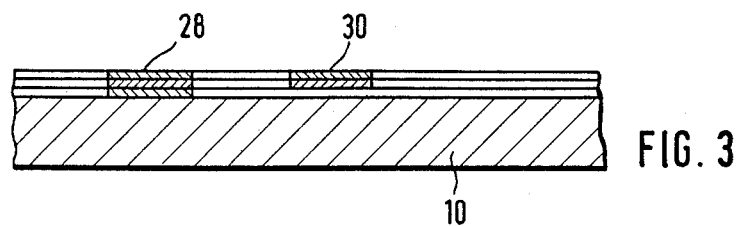

FIG. 3 shows another embodiment in which the three color layers applied to the card carrier material 10 are melted together in a locally limited area by means of the laser beam. All three color layers were melted together in area 28, which leads to another color mixture.

The color impression of areas 28 and 30 can also be produced by a chemical reaction between the individual color layers melted together. For this purpose microcapsules filled with a certain catalyst or reactant can be embedded in the color layers.

The micro-capsules burst when acted upon by a certain heat and thus trigger the reaction between the color layers or, for example, between the color layers and the adjacent carrier material and/or the surrounding atmosphere affecting the reaction.

It is also possible in certain cases to arrange a transparent cover film over the color layers. As the laser beam penetrates these layers which are non-absorbant by definition without affecting them in any way, the color reaction can also take place under the cover film or along with the material of the cover film in the case of the embodiment as in FIG. 3.

Any appropriate synthetic can be used as a material for the card carrier; a large range of possibilities is available to the expert for this purpose. Reference is only made in this connection, for example, to the published German patent Document No. 22 25 471 which mentions a number of synthetics appropriate as card carriers.

As explained above, it must be taken care that the absorptive or reflective behavior of the colors is coordinated to the energy supplied by the laser beam. The boiling and melting points of the colors are just as important. The selection of the proper values or colors is, however, no problem for the expert.

Known methods such as the offset and screen printing processes can be used to apply the color layers. If desired, colored synthetic films can also be used, which are laminated onto the card carrier material, instead of color layers.

What is claimed is:

1. A method of producing an identification card having visually detectable information, comprising:
    applying a plurality of color layers over each other on a synthetic carrier; and
    forming the information by contacting the color layers with a controlled laser beam and selecting the energy of the laser beam and the color layer characteristics in such a way that a new color is formed restricted to a certain area, said new color being formed by an interaction between the color layers produced by at least partially melting micro-capsules which have a reactant of colorant and are embedded in the superjacent color layers with the laser beam.

2. A method as in claim 1 wherein the color layer characteristics are selected such that said partial melting causes a chemical reaction between color layers to form said new color.

3. A method as in claim 2 wherein said visual detectable information is produced in a multi-color form by dots of color of a color triplet exposed by said laser beam which is acting upon the card point by point.

4. A method for producing identification cards having visually detectable information comprising;
    forming a card made up of at least two different color layers superimposed on a carrier layer;
    producing multi-colored visually detectable information on said card by the effect of a locally defined variable intensity laser beam, the intensity of said laser beam and the properties of the color layers being adjusted in such a way that by application of the laser beam to the color layers in a contact area, said color layers are removed layer by layer whereby the removal is defined by the intensity of said laser beam in a contact area so that separate color layers are selectively exposed.

5. A method as in claim 4, wherein the step of forming said card comprises forming the color layers as triangularly arranged dots and wherein the step of producing information further comprises acting upon the card point by point with the laser beam to produce a visually new color mixture by the removal of the triangularly arranged dots in the superjacent color layers.

6. A method as in claim 4, wherein at least one of the color layers comprises micro-capsules with an encapsulated ink- or dye material, said micro-capsules being destroyed by the application of the laser beam so that the layer shows a corresponding color change.

7. A method as in claim 4, including selecting the energy of the laser beam and the color layer characteristics in such a way that each color layer contacted by the laser beam forms a new color in the contact area.

8. A method as in claim 4, wherein
    said laser beam is controlled by a computer during the step of producing.

9. An identification card comprising;
    a carrier layer;
    at least two superjacent color layers with selective absorbtion characteristics printed on said carrier layer wherein said layers further comprise means for providing visually detectable information on the card by locally removed material from the printed color layers, said information is generated by locally evaporated material of said color layers by a variable energy laser beam, the energy of said laser beam bing controlled for the selective removal of said color layers in accordance with the absorbtion characteristics of said color layers.

10. An identification card as in claim 9, wherein the visually detectable information is present as a bas-relief in the form of local interruptions of the superjacent layer areas.

11. An identification card as in claim 9, wherein micro-capsules having a reactant or colorant are embedded in the superjacent layer areas.

12. An identification card as in claim 9, wherein the visually information is produced in a multicolor form by dots of color of a color triplet exposed by said laser beam.

* * * * *